United States Patent
Auslander et al.

(10) Patent No.: US 7,192,474 B2
(45) Date of Patent: *Mar. 20, 2007

(54) IR ABSORBING PHOTOSENSITIVE OPTICALLY VARIABLE INK COMPOSITIONS AND PROCESS

(75) Inventors: Judith D. Auslander, Westport, CT (US); Mike Y. R. Chen, Shelton, CT (US)

(73) Assignee: Pitney Bowes Inc., Stamford, CT (US)

( * ) Notice: Subject to any disclaimer, the term of this patent is extended or adjusted under 35 U.S.C. 154(b) by 77 days.

This patent is subject to a terminal disclaimer.

(21) Appl. No.: 10/873,320

(22) Filed: Jun. 22, 2004

(65) Prior Publication Data

US 2005/0279247 A1     Dec. 22, 2005

(51) Int. Cl.
*C09D 11/02*     (2006.01)

(52) U.S. Cl. .............................. 106/31.32; 106/31.64; 106/31.28

(58) Field of Classification Search ............. 106/31.32, 106/31.64, 31.28
See application file for complete search history.

(56) References Cited

U.S. PATENT DOCUMENTS

| | | |
|---|---|---|
| 4,015,131 A | 3/1977 | McDonough et al. |
| 4,705,567 A | 11/1987 | Hair et al. |
| 5,084,205 A | 1/1992 | Auslander |
| 5,114,478 A | 5/1992 | Auslander et al. |
| 5,135,569 A | 8/1992 | Mathias |
| 5,145,518 A | 9/1992 | Winnik et al. |
| 5,231,135 A | 7/1993 | Machell et al. |
| 5,294,664 A | 3/1994 | Morrison, Jr. et al. |
| 5,310,887 A | 5/1994 | Moore et al. |
| 5,331,097 A | 7/1994 | Gunnell et al. |
| 5,502,304 A | 3/1996 | Berson et al. |
| 5,514,860 A | 5/1996 | Berson |
| 5,525,798 A | 6/1996 | Berson et al. |
| 5,554,842 A | 9/1996 | Connell et al. |
| 5,569,317 A | 10/1996 | Sarada et al. |
| 5,571,331 A * | 11/1996 | Schertler et al. ............ 118/719 |

(Continued)

FOREIGN PATENT DOCUMENTS

EP          0344379          9/1988

(Continued)

*Primary Examiner*—J. A. Lorengo
*Assistant Examiner*—Veronica Faison-Gee
(74) *Attorney, Agent, or Firm*—Charles R. Malandra, Jr.; Angelo N. Chaclas

(57) ABSTRACT

Water-soluble, photosensitive, optically variable (POV) inks exhibit improved OCR readability due to improved infrared absorption properties. The inks can produce images that can be viewed with both visible and ultraviolet light to have physically coincident positive and negative images. The new inks contain at least two types of colorants in addition to the IR absorber and other suitable ingredients. The first colorant comprises a fluorescent dye or pigment emitting light within a characteristic emission band when excited by fluorescent-exciting radiation. The second colorant comprises a carbon black infrared radiation absorbing composition alone or with one or more dyes or pigments having a light absorption band at longer wavelengths than the characteristic emission band of the first colorant or also overlapping the emission wavelength of the first colorant in such a way as to result in a dark color. The inks are formulated to provide higher contrast in the presence of IR radiation while retaining a strong negative correlation between the visible and fluorescent images.

7 Claims, 5 Drawing Sheets

U.S. PATENT DOCUMENTS

| | | | |
|---|---|---|---|
| 5,626,654 A | 5/1997 | Breton et al. | |
| 5,630,868 A * | 5/1997 | Belmont et al. | 106/31.75 |
| 5,681,381 A | 10/1997 | Auslander et al. | |
| 5,746,818 A * | 5/1998 | Yatake | 106/31.86 |
| 5,766,324 A | 6/1998 | Ikegaya et al. | |
| 5,877,235 A | 3/1999 | Sakuma et al. | |
| 6,039,257 A | 3/2000 | Berson et al. | |
| 6,063,175 A | 5/2000 | Harris | |
| 6,079,327 A | 6/2000 | Sarada | |
| 6,083,310 A | 7/2000 | Peterson et al. | |
| 6,142,380 A | 11/2000 | Sansone et al. | |
| 6,143,807 A | 11/2000 | Lin et al. | |
| 6,157,919 A | 12/2000 | Cordery et al. | |
| 6,169,185 B1 | 1/2001 | Likavec et al. | |
| 6,174,938 B1 | 1/2001 | Miller et al. | |
| 6,176,908 B1 * | 1/2001 | Bauer et al. | 106/31.15 |
| 6,494,943 B1 | 12/2002 | Yu et al. | |
| 6,814,793 B2 * | 11/2004 | Akers et al. | 106/31.6 |
| 2002/0033117 A1 * | 3/2002 | Inoue et al. | 106/31.68 |
| 2002/0195586 A1 | 12/2002 | Auslander et al. | |
| 2003/0005303 A1 | 1/2003 | Auslander et al. | |
| 2003/0041774 A1 | 3/2003 | Auslander et al. | |
| 2005/0039633 A1 * | 2/2005 | Aoyama et al. | 106/31.28 |
| 2005/0166793 A1 * | 8/2005 | Looman et al. | 106/31.27 |

FOREIGN PATENT DOCUMENTS

| | | |
|---|---|---|
| EP | 1024182 A1 | 8/2000 |
| EP | 1046687 A1 | 10/2000 |
| GB | 2240947 A | 8/1991 |

* cited by examiner

IR ABSORBING PHOTOSENSITIVE OPTICALLY VARIABLE INK COMPOSITIONS AND PROCESS

BACKGROUND OF THE INVENTION

The invention relates to new photosensitive optically variable (POV) inks, and more particularly, to water soluble POV inks capable of printing images having improved OCR readability due to improved infrared absorption properties.

The POV inks of the invention are effective for use with inkjet printing and have a range of security applications. They can produce security markings of a type which set them apart from other inks. POV inks present a significant challenge to counterfeiting when available from a secure source or licensed supplier, and are often required to be read by OCR readers which suffer in accuracy due to infrared light. The invention provides inkjet inks having the security features of POV inks while having improved OCR processing by laser-based systems widely in use.

The inks of the invention are photosensitive optically variable, meaning that they can provide a printed visually black or dark gray machine-readable information-bearing marking that fluoresces in a specific wavelength range when excited with a shorter wavelength light. The printed images exhibit visual light absorption throughout the entire visual spectrum including the red region of the visible spectrum where red inks are invisible to typical automatic scanning systems. Inks of this type are described, for example by U.S. Patent Publication No. 2003/0041774, U.S. Patent Publication No. 2002/0195586, commonly-assigned, copending U.S. patent application No. Ser. No. 10/873,319 entitled, Photosensitive Optically Variable Ink Compositions Useful for Ink Jet Printing, filed on equal date with this application, in the name of Judith D. Auslander, and commonly-assigned, copending U.S. patent application No. Ser. No. 10/873,321 entitled, Signature Protected Photosensitive Optically Variable Ink Compositions and Process, filed on equal date with this application, in the name of J. D. Auslander and M. Chen. These inks will achieve acceptable PCS (Print Contrast Signal) on virtually all conventional substrates, including dark papers such as Kraft or Manila. The term PCS refers to the ratio of the Print Reflectance Difference (PRD) and the substrate reflectance, and the PRD is the difference between the paper reflectance and ink reflectance. These and other postal terms are given their meanings as defined by the United States Postal Service (USPS). These inks can be used with automated detectors of various types of information-bearing tickets, tags, labels, postage indicia and similar security markings.

There is a need for additional POV inks that provide effective security with improved OCR readability due to improved infrared absorption properties.

SUMMARY OF THE INVENTION

It is another object of invention to provide new photosensitive optically variable inks.

It is an object of the invention to provide a new inks effective for security marking with better readability by OCR equipment.

It is another object of invention to provide security inks having unique optical and physical penetration properties to enhance their use in providing improved OCR readability due to improved infrared absorption properties.

It is another object of invention to provide a new type of POV ink having improved OCR readability, which can be printed with inkjet printing.

These and other objects are accomplished by the invention, which provides ink compositions, processes for using them and the resulting products.

The inks of the invention are aqueous and capable of producing dark, machine-readable markings exhibiting fluorescence when exposed to fluorescent-exciting radiation, and are of suitable viscosity and surface tension for use in ink jet printing. They comprise: (a) a first colorant comprising a fluorescent dye and/or pigment emitting light within a characteristic emission band when excited by fluorescent-exciting radiation; (b) a second colorant comprising a carbon black infrared radiation absorbing composition alone or with one or more dyes or pigments having a light absorption band at longer wavelengths than the characteristic emission band of the first colorant or also overlapping the emission wavelength of the first colorant in such a way as to result in a dark color, preferably black, and (c) an aqueous liquid vehicle comprising water and a water-soluble vehicle in sufficient amounts to achieve an ink viscosity and surface tension effective for application of the ink to a substrate in a predetermined pattern by ink jet printing.

The process of the invention comprises: printing an image having visible and fluorescent components by providing an inkjet printer with an ink as described, and printing an image with the ink on a suitable substrate. In a preferred embodiment, the process will include: illuminating the image with ultraviolet radiation and reading the resulting reverse image, and illuminating the image with visible light and subjecting the visible image to optical character recognition.

The inks of the invention and the processes for using them, as well as the resulting products, have a number of preferred aspects, many of which are described below and shown in the accompanying drawings.

BRIEF DESCRIPTION OF THE DRAWINGS

The invention will be better understood and its advantages will become more apparent from the following description, especially when read in light of the accompanying drawing, wherein.

DETAILED DESCRIPTION OF THE INVENTION

The invention relates to new photosensitive optically variable (POV) inks capable of printing images by various printing means, including inkjet printing. The term "photosensitive optically variable" means that the inks can provide a printed visually black or dark gray machine-readable information-bearing marking that fluoresces in a specific wavelength range when excited with a shorter wavelength light. The printed images exhibit visual light absorption throughout the entire visual spectrum including the red region of the visible spectrum where red inks are invisible to typical automatic scanning systems. Inks of this type are described, for example, by U.S. Patent Publication No. 2003/0041774, U.S. Patent Publication No. 2002/0195586, and commonly-assigned, copending U.S. patent application Ser. No. 10/873,319 entitled, Photosensitive Optically Variable Ink Compositions Useful for Ink Jet Printing, filed on equal date with this application, in the names of J. D. Auslander and M. Chen, and commonly-assigned, copending U.S. patent application Ser. No. 10/873,321 entitled, Signature Protected Photosensitive Optically Variable Ink Compositions and Process, filed on equal date with this application, in the name of J. D. Auslander. As with the inks described therein, the inks of the invention can produce images that can be viewed with both visible and ultraviolet light to have physically coincident positive and negative images. The inks of the invention, however, provide additional functionality, having improved OCR readability due to improved infrared absorption properties.

Figure 1:
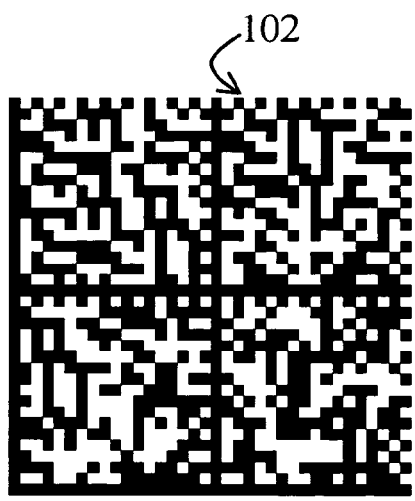
FIG. 1 illustrates both visible and fluorescent images enabled by printing the inks of the invention on a substrate, one of a printed substrate in reflection under illumination by visible light and one of the same printed substrate fluorescing under ultraviolet excitation.
Figure 1:
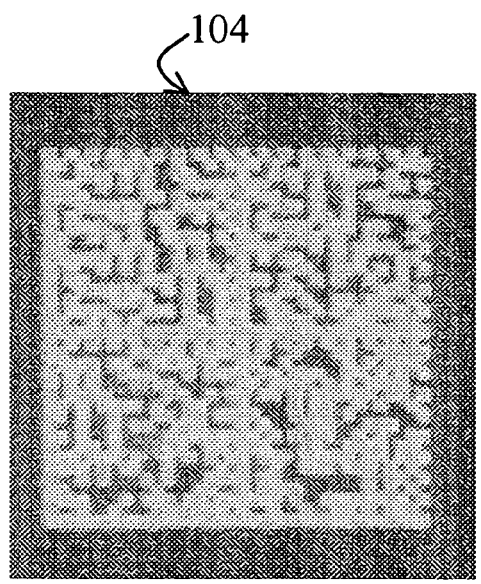

The inks of this invention can be utilized in a number of ink jet printing operations, giving visible dark and fluorescent images. FIG. 1 illustrates both visible and fluorescent images enabled by printing the inks of the invention on a substrate, one of a printed substrate in reflection under illumination by visible light and one of the same printed substrate fluorescing under ultraviolet excitation. An application of a POV security marking in the field of postage evidencing is a black postage indicium that fluoresces in the red region of the spectrum when illuminated with ultraviolet light. FIG. 1 shows machine-scanned images 102 and 104 of a POV security marking including a DataMatrix bar code. The image scanned in reflection 102 was obtained by illuminating the marking with visible light. The low reflectance of the black ink results in dark areas of the scanned image corresponding to printed areas of the security marking. The image scanned in fluorescence 104 is obtained by viewing the visible red-fluorescent emissions under ultraviolet (UV) illumination. The scanned image 104 shows that the security marking emits visible light when illuminated with UV light resulting in light areas in the scanned image corresponding to the printed areas. Comparison of images 102 and 104 shows that the fluorescing image is a negative of the reflective image, i.e., there is a strong negative correlation between the two images.

Thus, the inks of the invention are photosensitive optically variable (POV) inks that produce visible, dark prints that fluoresce when excited with a shorter wavelength light such as ultraviolet light and are very effectively used for applications requiring OCR capability, especially utilizing a light source providing significant illumination at wavelengths above about 700 nm, and especially at 780 nm and above.

The inks of the invention will comprise at least two distinct colorant portions to achieve the objectives of coincident visible and fluorescent images with characteristic properties and improved OCR processability.

A first colorant potion will comprise a fluorescent pigment and/or dye emitting light within a characteristic emission band when excited by fluorescent-exciting radiation. Red fluorescence is preferred. The fluorescent dye will be present in the formulation in concentration effective to provide both a necessary contribution to the visible color of the ink and to provide a machine detectable fluorescent image. Among the suitable fluorescent dyes for the first colorant are those dyes meeting the objectives herein described, for example, by U.S. Patent Publication No. 2003/0041774, U.S. Patent Publication No. 2002/0195586, and commonly-assigned, copending U.S. patent application Ser. No. 10/873,319 entitled, Photosensitive Optically Variable Ink Compositions Useful for Ink Jet Printing, filed on equal date with this application, in the names of J. D. Auslander and M. Chen, and commonly-assigned, copending U.S. patent application Ser. No. 10/873,321 entitled, Signature Protected Photosensitive Optically Variable Ink Compositions and Process, filed on equal date with this application, in the name of J. D. Auslander. Thus, the invention can utilize water soluble as well as polymer embedded fluorescent dyes. The noted publications list representative compositions and illustrate and describe concentrations for use. The disclosure of this technical detail is hereby incorporated by reference.

Among preferred water soluble fluorescent dyes are those characterized by red fluorescence and a suitably intense visible color to provide a dark color to the ink in the ink composition. The most preferred of this class have visible colors ranging from red to green and fluoresce by emitting light within the range of from 390 to 680 nm. Preferred yellow or orange fluorescent dye components may be based on the chromophoric systems such as anionic coumarins, cationic coumarins, anionic naphthalimide dyes, pyranine (anionic pyrene dye), neutral, anionic and cationic perylene dyes, and anionic xanthene dyes. Some preferred yellow or orange fluorescent dyes are anionic coumarines, cationic coumarines, courmarine sulfonic acid, anionic napthalimide, neutral perylene, cationic perylene, anionic pyronine, and anionic napthalimide dyes, as illustrated for example in FIG. 13 of U.S. Patent Publication No. 2002/0195586. Among the useful red and purple fluorescent dyes are anionic xanthene dyes, bispyrromethane boron complexes, cationic and zwitterionic pyronines and sulphorhodamine B (SRB), as illustrated for example in FIG. 14 of U.S. Patent Publication No. 2002/0195586. Acid Red 52 is a suitable water-soluble magenta dye. Acid Red 52 dye has satisfactory solubility in water but a very low water fastness as normally employed. Thus, a disadvantage of the magenta Acid Red 52 dye is that the ink containing such dye bleeds when exposed to water. Also among the useful yellow and orange dyes are acid yellow 7, coumarin sulfonic acid, cationic coumarins, anionic coumarins, neutral, anionic and cationic perylene dyes, anionic naphthalimide dyes and pyranine dyes. An important feature of these dyes is their ability to form a dark colored ink with good fluorescent properties. These and the other ones identified in U.S. Patent Publication No. 2003/0041774, can be employed as effective.

In order to achieve a black ink, the colorant mixture of the invention must absorb across the entire visible spectrum, from 390 nm to ca. 1200 nm. To obtain simultaneous red fluorescence in ultraviolet light in the desired region of 580–630 nm, the composition must absorb fluorescence exciting radiation, e.g., UV light, efficiently and fluoresce efficiently, preferably between 580 and 630 nm. The first colorant dye (or dyes) is selected to meet these criteria in combination with the second colorant of the invention which has a light absorption band at longer wavelengths than the characteristic emission band of the first colorant or also overlapping the emission wavelength of the first colorant in such a way as to result in a dark color, preferably black. The inks of the invention are particularly effective as black inks due to the presence to the carbon black infrared radiation absorbing composition, to be described later as a component of the second colorant, added by the invention to the POV inks of the above described formulations.

The second colorant will be present in the formulation in concentration effective to provide a necessary contribution to the visible color of the ink without preventing machine detectable fluorescent image. The second colorant essentially comprises a carbon black infrared radiation absorbing composition. In addition they can also contain any of the dyes and/or pigments described in the aforementioned U.S. Patent Publication No. 2003/0041774, U.S. Patent Publication No. 2002/0195586, and commonly-assigned, copending U.S. patent application Ser. Nos. 10/873,319 and 10/873,321. The inks of the invention typically employ the second colorant at concentrations (based on the weight of dry solids) of from about 1 to about 5%, more narrowly, from 2 to 4%, by weight of this second colorant in the ink composition as applied. The dyes and/or pigments will have characteristic penetrations into paper and preferred members of the group will not significantly lose definition due to water wetting after printing by inkjet printing. Without the use of carbon black according to the invention, the inks will have poor absorbance at wavelengths of above about 780 nm. The presence of carbon black will greatly improve the absorbance at longer wavelengths and make the inks better for the purpose of printing OCR intended images.

The carbon black infrared absorber will be one that is fully and stably dispersed in the ink vehicle for printing, preferably by inkjet printing. It can be the sole dark pigment or colorant, in which case it will tend to quench the fluorescence to an extent, but this may be advantageous in some circumstances. Among the suitable carbon black pigments are Sun Jetsperse LJD 3207, Orient Bonjet Black (CW-1 and CW-2) and Degussa IDIS 31k, carbon black and others formulated for and/or supplied by manufacturers as suitable for inkjet printing inks. These carbon blacks are characterized by a capability to be dispersed in a water based ink and purity effective for ink jet inks, and they will typically comprise less than 10%, e.g., from about 2 to about 7%, of dispersion by weight of the ink formulations.

Among the optional colorants suitable for use in the second colorant of the inks of the invention the water dispersible colloidal pigments, as described, for example, in U.S. Pat. No. 6,494,943 to Yu, et al., and one or more appropriately colored water soluble dyes as described, for example, in U.S. Patent Publication No. 2003/0041774. The pigments described broadly by the Yu, et al. patent are identified as colored pigments having one or more desired parameters and/or properties are described. These parameters and/or properties include: a) a particles size of from about 10 nm to about 300 nm; b) an accusizer number of less than $10^{10}$ particles/ml of dispersion at 15% solids which are greater than 0.5 micron; c) a filterability such that when in a liquid medium, 100 ml having 10% solids of the colored pigment filters through a 3 micron nylon absolute filter; d) a colored pigment purity of greater than about 80%, based on extractable material; and/or e) a stability such that the above-described properties do not change by more than 50% at 25° C. for at least one week. Similarly, the preferred pigments of the invention can be characterized as having one or more of these properties. In addition to these pigments are those that require dispersants to remain stable. One preferred colloidal pigment is available from Cabot Corporation as Cabot Blue Pigment Dispersion, Cyan COJ 250. Pigments of this type will not bleed to the extent of dyes, yet in the formulations of the invention will provide a penetration and water fastness highly desirable for security and other value metered markings.

The second colorant will also preferably include one or more appropriately colored water soluble dyes as described, for example, in U.S. Patent Publication No. 2003/0041774. Among these are blue dyes, such as acid and direct dyes purified for ink jet use such as Cl Acid Blue 9, Duasyn Blue FRL-SF (Direct Blue 199), Profast Cyan 2(Direct Blue 307 or any blue dye with an extinction coefficient higher than 10,000 soluble in water. The dye can also be one of the dyes mentioned above, selected to provide a desired color, shade or hue in the visible range, while providing suitable darkness in the printed ink to maintain readability and suitable fluorescence to provide machine readability.

In addition to the described colorants and equivalents, the ink compositions of the invention will contain an aqueous liquid vehicle comprising water and a water-soluble vehicle in sufficient amounts to achieve an ink viscosity and surface tension effective for application of the ink to a substrate in a predetermined pattern by ink jet printing. Typical of these components are those described in the above noted patent publications, which are hereby incorporated by reference. The ink carrier for the colorants used in these ink compositions typically contains 65% or more water.

Fluorescence stabilizers can be employed in concentrations effective for maintaining (sometimes by enhancing fluorescence) the constant fluorescence level. Since the fluorescence of low viscosity inks can decrease as the ink penetrates the paper, it is preferred to include an additive effective to help maintain a constant level of fluorescence. The following solvents can provide enhancement of fluorescence: N,N-Dimethylacetamide, sulfolane, formamide, methylphenyl sulfoxide, N-Methylpyrrolidinone, 4-Methylmorpholine-N-oxide (MMNO), dimethylsulfoxide (DMSO), and the like. All of these solvents have the characteristic of a dipolar aprotic solvent with a high dielectric constant (>ca. 20) or high value of Hildebrand solubility parameter ($\delta>10$ MPa$^{1/2}$).

From this list, the 4 methylmorpholine-N-oxide (MMNO) had the best ability to achieve long term increased fluorescence, has no fluorescence quenching tendency and is a hygroscopic high boiling solid when pure. (It is typically supplied as 50–60% aqueous solution.) The MMNO is a known solvent for cellulose and aids penetration into the fibers of the paper, which may increase the fluorescence in a selective and long lasting manner. Polar low molecular weight resins (PLMWR) are of benefit to enhance and stabilize the fluorescence, in many cases to a lesser extent and by a different mechanism that the FS materials described above. Polar resins such as polyvinylpyrrolidone (MW 15000) and polyethyleneglycols are beneficial. Other water-soluble resins with good solvent characteristics for polar dyes are: polyvinylalcohol, poly N,N-dimethylhydantoin, polyacrylates, etc.

Glycol ethers, such as BTG (Triethylene Glycol Mono Butyl Ether), can have multiple beneficial effects such as: bridging between the water and other organic solvents, enhancing the color and fluorescence by internal hydrogen bonding, and improved penetration into the paper. The most efficient glycol was the BTG. Among suitable glycols that could be used are as following: triethylene glycol n-Butyl Ether (BTG), tripropylene glycol methyl ether (TPM), diethylene glycol n-butyl ether (DB), diethylene glycol methyl ether (DM), dipropylene glycol methyl ether (DPM), and the like.

Amines such as triethanol amine, ethanol amine, diethanolamine, trisopropanolamine, butyidiethanolamine, N,N dimethylethanolamine, N,N diethylethanolamine, N,N dipropylethanolamine, and the like can be useful in preventing the aggregation of the dyes, the evaporation during drying as a fugitive counterion and thus providing improved waterfastness as well as for improved solubility in water/ glycol/ether mixtures. The amine helps also in maintaining constant viscosity during long periods of rest as well as fluidity and easy redispersibility. In addition, the amine does not cause clogging of nozzles during printing or at the time of restarting after interruption of printing, thus maintaining high ejection stability.

The ink compositions of the invention are illustrated below in preferred forms and are, in these forms and others, highly effective for ink jet imprinting visible and fluorescent images, both preferably being machine readable with improved readability for OCR applications. The visible images are clear to normal human sight and effective for use with various image-reading machines operable for light in the visual range. The images are also sufficiently fluorescent, despite quenching due to the presence of colored dyes or pigments, to provide machine-readable fluorescent images which are substantial negatives of the visible images. Desirably, within the spectral range of interest (SROI), e.g., from 390 to 680 nm (visible range), the ink reflectance is less than 50% of the paper reflectance.

The inks of the invention are capable of imagewise application by ink jet printing and of providing machine-readable images when exposed to visible and fluorescent-exciting radiation. For an ink to be effectively used by ink jet printing, it must have a suitably low viscosity, yet have sufficient solids for it to achieve sufficient fluorescence and visible light reflectance to provide discernable images when dried. Preferably, the dry inks will provide machine-readable images having improved OCR readability on a wide variety of substrates.

The inks will contain an aqueous liquid vehicle comprising water and a water-soluble vehicle in sufficient amounts to achieve an ink viscosity and surface tension effective for application of the ink to a substrate in a predetermined pattern by ink jet printing. Viscosities will typically be less than about 15 cps. For thermal ink jet printing, the viscosity should be within the range of from 1 to 5 cps when measured Haake Viscotester at 25° C., preferably from 2 to 4 cps, and exhibit a surface tension of from 20 to about 80 dyne/cm when measured by Fisher Surface Tensiomat at 25° C., preferably from 30 to 50 dyne/cm. For ink jet printing by piezoelectric means, the viscosity should be within the range of from 1.5 to 15 cps when measured by the above method, preferably from 2 to 12 cps.

The preferred inks of the invention will have a visual dark color (neutral black) and a red-fluorescent signal, when excited with UV light short or long wavelength. The print contrast signal PCS (also, PCR) is preferably greater than 0.35, for white and kraft papers with the red or green filters, when measured with the Envelope Reflectance Meter from the USPS. For white paper with red filter, values of greater than 0.45 are desired, e.g., 0.48 and above, e.g., 0.48–0.6, and essentially the same values with a green filter. For kraft paper, it is preferably greater than 0.35, e.g., 0.37–0.5 for a green filter and 0.45 and above, e.g., 0.43–0.6, with a red filter. The test methodology for this and other data referred to herein is described, for example, in U.S. Patent Publication No. 2003/0041774.

The PRD is preferably greater than 0.25 for white and kraft paper with the red and green filters. For white paper with a red filter, it can be 0.60 and above and 0.55 and above for a green filter. For kraft paper with a red filter, it can be 0.30 and above and 0.25 and above for a green filter. The optical density of the visible component is therefore high enough to allow automatic scanning using an OCR scanner or the like. The fluorescent component is suitable for use by the facing equipment to orient the mail and, preferably, to discriminate from green phosphorescent stamps. The emissions are in the wavelength range of 580–640 nm when excited by UV light. The fluorescent intensity should be at least 7 PMU and for examples is in the range of (39–69) Phosphor Meter Unit (PMU) for solid printed areas and 50 to 98 PMU for drawdowns, the fluorescent component can be carried by the solvent (carrier) into the substrate and provide adequate fluorescent signal intensity. The presence of carbon black will greatly improve the absorbance at longer wavelengths and make the inks better for the purpose of printing OCR intended images while retaining a strong negative correlation between the visible and fluorescent images.

The process of the invention comprises: printing an image having visible and fluorescent components by providing an inkjet printer with an ink as described, and printing an image with the ink on a suitable substrate. In a preferred embodiment, the process will include: illuminating the image with ultraviolet radiation and reading the resulting reverse image, and illuminating the image with visible light and subjecting the visible image to optical character recognition (OCR), with equipment designed to read with light in the spectral range of the illuminating light. It is an advantage of the invention that the OCR readability is improved as compared to inks without the carbon black and that there is still a strong negative correlation between the fluorescent and visible light images.

The following examples are presented to further illustrate and explain the invention and are not to be taken as limiting in any regard. Unless otherwise indicated, all parts and percentages are by weight.

EXAMPLE 1

A series of inks is prepared for comparing several containing carbon black according to the invention to one without it as a control. The inks were prepared from the following materials:

FORMULATION OF INKS USING LUMIKOL DISPERSIONS
WITH DIFFERENT CARBON BLACK

| Components | wt (%) | | | | | | |
|---|---|---|---|---|---|---|---|
| Acryjet Cyan 157 | 3.10 | 3.02 | 3.00 | 3.04 | 2.93 | 2.97 | 2.97 |
| Lumikol Orange 3204C | 16.03 | 15.61 | 15.51 | 15.67 | 15.14 | 15.31 | 15.33 |
| Lumikol Red 3203C | 18.63 | 18.15 | 18.03 | 18.22 | 17.60 | 17.81 | 17.82 |

FORMULATION OF INKS USING LUMIKOL DISPERSIONS
WITH DIFFERENT CARBON BLACK

| Components | wt (%) | | | | | | |
|---|---|---|---|---|---|---|---|
| Trimetylglycine | | | | | | | |
| Triethylene Glycol mono n-Butyl Ether | 3.35 | 3.27 | 3.25 | 3.28 | 3.17 | 3.21 | 3.21 |
| 1,2,4-Butanetriol | 6.71 | 6.54 | 6.49 | 6.56 | 6.34 | 6.41 | 6.42 |
| Carbon Black | none | CW-1 | CW-2 | IDIS 40 | IDIS 31K | HJ 2676 | AJ 357 |
| Orient Bonjet Black CW-1 | | 2.57 | | | | | |
| Orient Bonjet Black CW-2 | | | 3.23 | | | | |
| Degussa IDIS 40 | | | | 2.20 | | | |
| Degussa IDIS 31K | | | | | 5.54 | | |
| Clariant HOSTAJET BLK VP2676 | | | | | | 4.44 | |
| Acryjet Black 357 | | | | | | | 4.35 |
| Distilled Water | 52.17 | 50.83 | 50.49 | 51.03 | 49.28 | 49.86 | 49.90 |
| Total | 100 | 100 | 100 | 100 | 100 | 100 | 100 |

| Properties of Inks and Viscosity Tests | | | | | | | |
|---|---|---|---|---|---|---|---|
| PMU (drawdown) | 130 | 45 | 51 | 29 | 35 | 36 | 31 |
| OD (drawdown) | 0.51 | 0.78 | 0.75 | 0.81 | 0.78 | 0.76 | 0.79 |
| Initial Viscosity (cp) | 2.91 | 2.89 | 2.91 | 3.08 | 2.88 | 3.05 | 3.18 |
| Viscosity (cp) after 182-hr @ 60° C. | 3.66 | 3.72 | 3.77 | 19.3 | 2.82 | 4.82 | 360 |
| IR Absorption | | | | | | | |
| IR absorption @ 900 nm wavelength | 0.00 | 0.43 | 0.41 | 0.51 | 0.52 | 0.47 | 0.51 |

Figure 2:
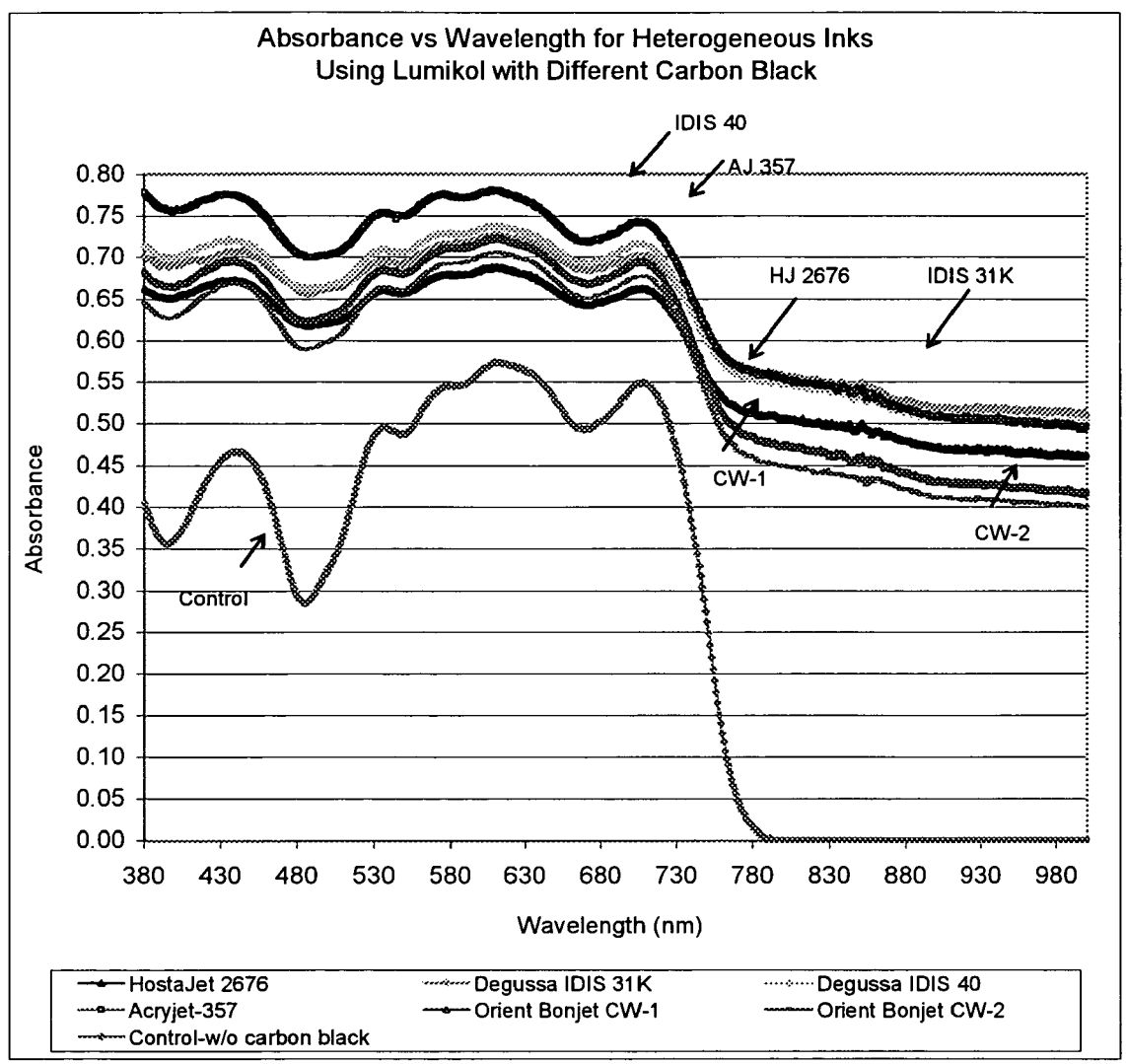
FIG. 2 is a graph showing absorbance versus wave length for heterogeneous POV inks with and without carbon black.

FIG. 2 is a graph showing absorbance versus wave length for a series of heterogeneous inks as formulated above. It can be seen that the ink without the carbon black has virtually no absorbance at wavelengths above about 780 nm, while with the carbon black, the inks retain good absorbance.

The inks shown in the table above were also tested for stability in terms of viscosity and separation.

Based on viscosity tests it was determined that:
  The ink with Degussa Carbon Black 31 k is most stable.
  Inks with Orient carbon black (CW-1 and CW-2) are also stable.
  The ink with Acryjet Carbon Black 357 is least stable.

Figure 3:
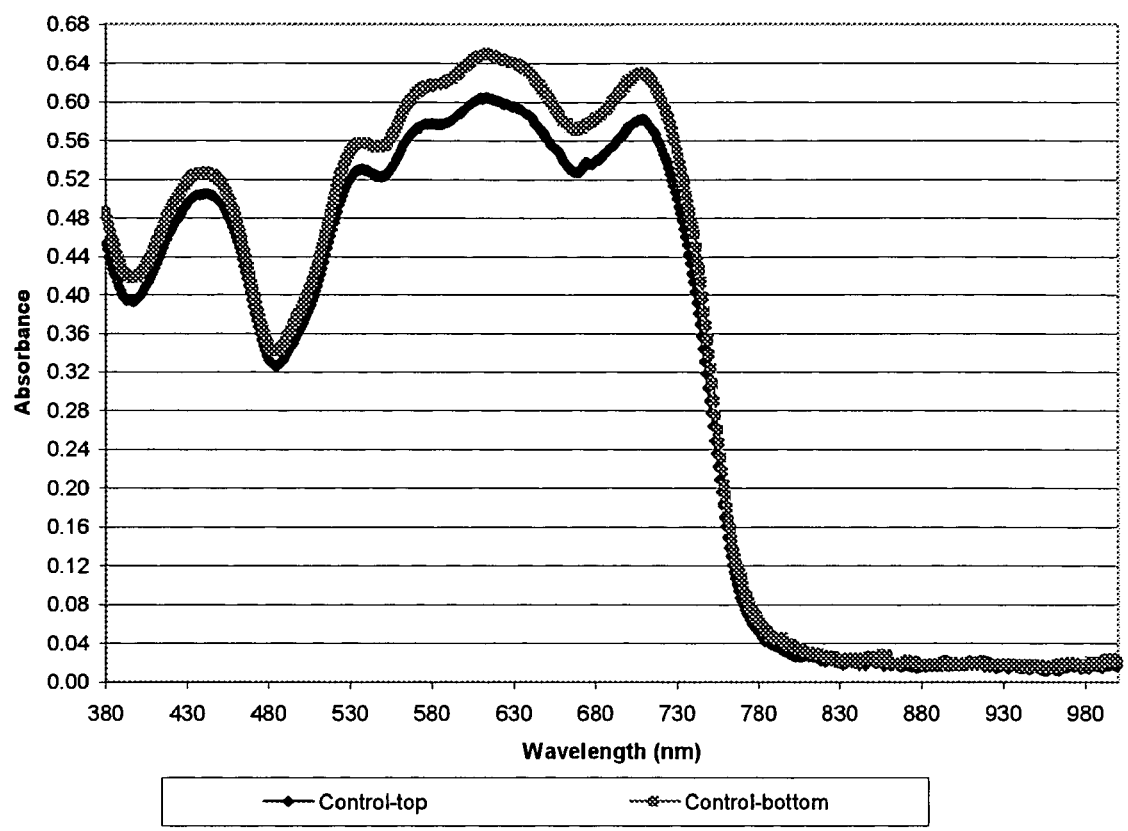
FIG. 3 is a graph showing the absorption spectra for a control ink without carbon black to illustrate baseline stability.
Figure 4:
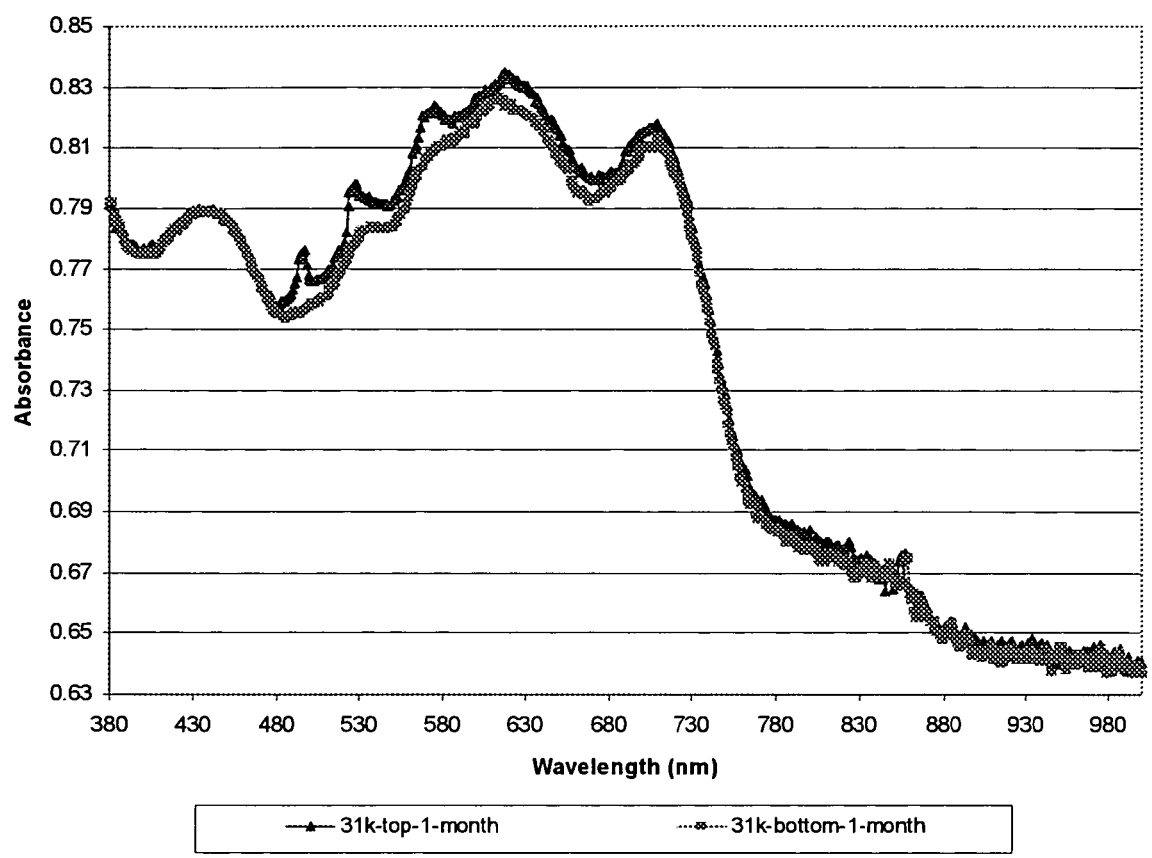
FIG. 4 is a graph showing the absorption spectra for an ink with Clariant HOSTAJET BLK VP2676 carbon black.
Figure 5:
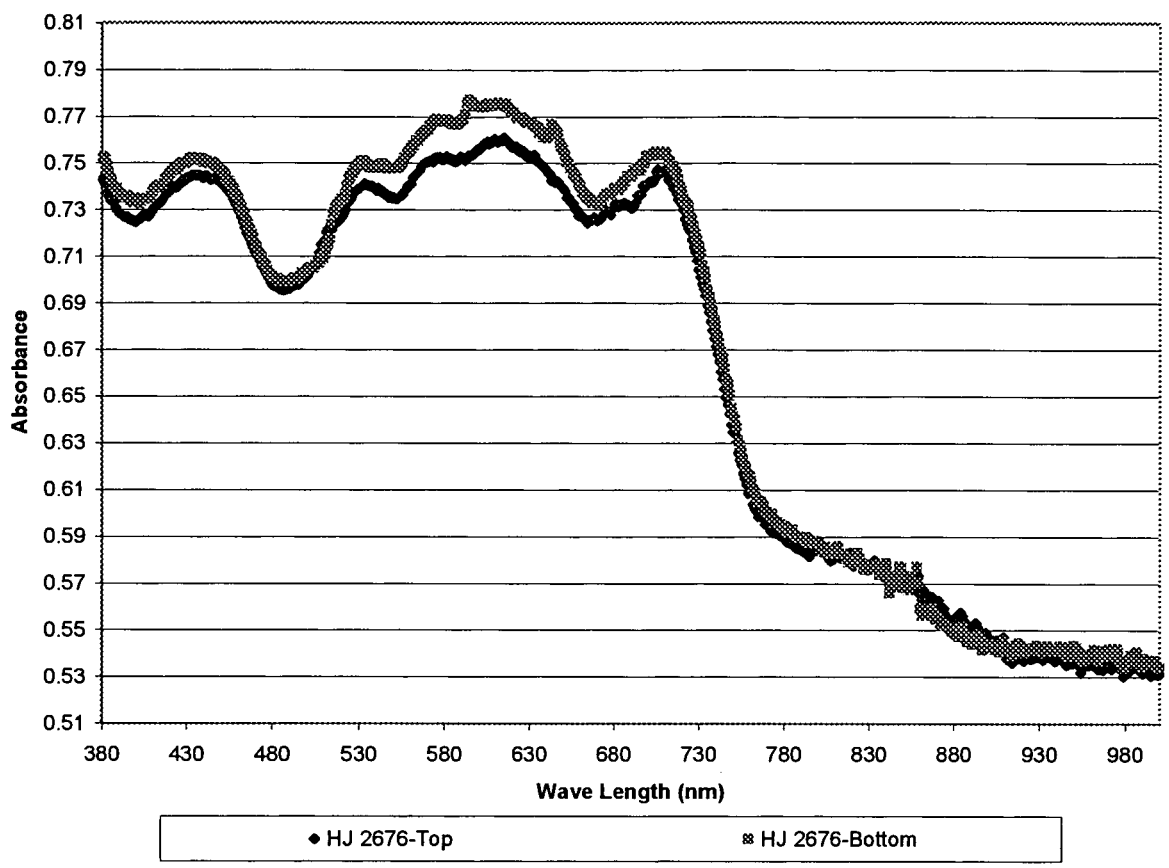
FIG. 5 is a graph showing the absorption spectra for an ink with Clariant Degussa Carbon Black 31 k carbon black.

The inks were tested for stability to separation by putting them into a bottle for a defined period of time without disturbing. Drawdowns were made separately using ink from top and bottom of the bottle. The spectra were shown for inks settling for 1 month at room temperature and 65-hr at 600° C. oven.
  The absorption charts for the control without carbon black (FIG. 3), and ink with Clariant HOSTAJET BLK VP2676 (FIG. 4) and Degussa Carbon Black 31k (FIG. 5) were made for comparison.
  The ink with Degussa Carbon Black 31k was most stable.
  The ink with Acryjet Carbon Black 357 was most unstable. Total separation occurred, no spectra were made.

EXAMPLE 2

Another ink according to the invention was prepared from the following materials:

| Components | Wt (%) |
|---|---|
| Distilled Water | 70.3 |
| Triethanolamine (TEA) | 0.34 |
| 4 methylmorpholine-N-oxide (MMNO) | 2.81 |
| Polyvinyl pyrollidone PVP K12 | 5.74 |
| Triethylene Glycol Mono Butyl Ether (BTG) | 2.81 |
| DBSA | 0.85 |
| 1,2,4-butanetriol | 4.4 |
| Urea | 7.95 |
| Acid Yellow 7 (Pylam, 500%) | 0.31 |
| Acid Red 52 (Pylam, 400%) | 0.44 |
| Pyranine 120 (Bayer) | 1.18 |
| Carbon Black Dispersion, Acryjet Black 357 | 1.82 |
| Blue Colloidal Pigment Millijet Blue 28 | 1.02 |
| Total | 100.0 |

| Properties of Ink and Drawdown | |
|---|---|
| PMU (drawdown) | 64 |
| OD (drawdown) | 0.78 |
| pH | 7.89 |
| Viscosity (cp) | 2.87 |
| Surface Tension (Dynes/cm) | 36.1 |
| Properties of Print (printed by GEM meter) | |
| PMU (Eagle area) | 6 |
| PMU (Indicia) | 18 |
| OD (Solid Area) | 0.75 |

EXAMPLE 3

Another ink according to the invention was prepared from the following materials:

| Components | Wt % |
|---|---|
| Distilled Water | 64.18 |
| Triethanolamine (TEA) | 0.30 |
| MMNO | 2.55 |
| PVP K12 | 4.94 |
| Triethylene Glycol Mono Butyl Ether (BTG) | 2.89 |
| DBSA | 0.81 |
| 1,2,4-butanetriol | 3.95 |
| Glycerol | 5.92 |
| Urea | 2.57 |
| Acid Yellow 7 (Pylam, 500%) | 0.30 |
| Acid Red 52 (Pylam, 400%) | 0.42 |
| Pyranine 120 (Bayer) | 1.14 |
| Carbon Black (Degussa IDIS 31K) | 2.89 |
| Millijet Blue 28 | 1.08 |
| Lumilux CD380 | 6.07 |
| Total | 100.0 |

| Properties of Ink and Drawdown and Prints | |
|---|---|
| OD (Drawdown) | 0.79 |
| PMU (Drawdown) | 88 |
| PMU (Eagle area) | 13 |
| PMU (Indicia) | 28 |
| OD (Printed Solid Area) | 0.72 |
| pH | 7.82 |
| Viscosity (cp) | 3.63 |
| Surface Tension (dyne/cm) | 35.1 |

The ink was tested using GEM meter for more than 25-day with good print image and no nozzle out. At least twenty prints with full image could be generated without purging, all nozzles were good after 20-print. This ink employs a europium based composition in the Lumilux CD380 component, which provides a unique signature as is the subject of noted copending application docket no. F-738, which is incorporated herein by reference.

The above description is intended to enable the person skilled in the art to practice the invention. It is not intended to detail all of the possible modifications and variations, which will become apparent to the skilled worker upon reading the description. It is intended, however, that all such modifications and variations be included within the scope of the invention which is seen in the above description and otherwise defined by the following claims. The claims are meant to cover the indicated elements and steps in any arrangement or sequence which is effective to meet the objectives intended for the invention, unless the context specifically indicates the contrary.

What is claimed is:

1. An aqueous ink capable of providing a secure marking including a dark, machine-readable image exhibiting fluorescence when exposed to fluorescent-exciting radiation, said ink being of suitable viscosity and surface tension for use in ink jet printing, comprising:
    (a) a first colorant comprising a fluorescent dye and/or pigment emitting light within a characteristic emission band when excited by fluorescent-exciting radiation;
    (b) a second colorant comprising a carbon black infrared radiation absorbing composition alone or with one or more dyes or pigments having a light absorption band at longer wavelengths than the characteristic emission band of the first colorant or also overlapping the emission wavelength of the first colorant in such a way as to result in a dark color, preferably black, and
    (c) an aqueous liquid vehicle comprising water and a water-soluble vehicle in sufficient amounts to achieve an ink viscosity and surface tension effective for application of the ink to a substrate in a predetermined pattern by ink jet printing.

2. An ink according to claim 1 wherein the colorants are selected such that the net effect between fluorescence and quenching by the other components of the ink when dry provides a phosphor meter reading of at least 7 PMU.

3. An ink according to claim 1 wherein the second colorant comprises a colloidal pigment.

4. An ink according to claim 1 wherein the colorants are selected such that an image when dry after a draw down on white envelope substrate exhibits a fluorescent intensity of 50 to 99+PMU.

5. An ink according to claim 1 wherein a dry, inkjet image exhibits a viscosity of less than 15 cps.

6. A process for printing a secure image having visible and fluorescent components, comprising:
    providing an inkjet printer with an ink as described in claim 1, and
    printing an image with the ink on a suitable substrate.

7. A process according to claim 6, which further includes:
    illuminating the image with ultraviolet radiation and reading the resulting reverse image, and
    illuminating the image with visible light and subjecting the visible image to optical character recognition, with equipment designed to read with light in the spectral range of the illuminating light.

* * * * *